United States Patent
Chen et al.

(10) Patent No.: US 8,732,433 B2
(45) Date of Patent: May 20, 2014

(54) APPARATUSES AND METHODS FOR PROVIDING DATA FROM MULTIPLE MEMORIES

(75) Inventors: Yi Chen, Shanghai (CN); Yihua Zhang, Shanghai (CN); Keith E. Winters, Canby, OR (US)

(73) Assignee: Micron Technology, Inc., Boise, ID (US)

( * ) Notice: Subject to any disclaimer, the term of this patent is extended or adjusted under 35 U.S.C. 154(b) by 43 days.

(21) Appl. No.: 13/219,417

(22) Filed: Aug. 26, 2011

(65) Prior Publication Data

US 2013/0054937 A1 Feb. 28, 2013

(51) Int. Cl.
*G06F 12/02* (2006.01)
*G06F 12/06* (2006.01)

(52) U.S. Cl.
CPC .................................. *G06F 12/0623* (2013.01)
USPC .......................................................... 711/211

(58) Field of Classification Search
CPC .................................................. G06F 12/0623
See application file for complete search history.

(56) References Cited

U.S. PATENT DOCUMENTS

| | | | |
|---|---|---|---|
| 5,305,319 A | 4/1994 | Sowell | |
| 5,666,322 A * | 9/1997 | Conkle | 365/230.03 |
| 5,761,732 A * | 6/1998 | Shaberman et al. | 711/157 |
| 5,991,233 A * | 11/1999 | Yu | 365/238.5 |
| 6,292,873 B1 * | 9/2001 | Keaveny et al. | 711/149 |
| 6,415,364 B1 * | 7/2002 | Bauman et al. | 711/155 |
| 6,700,828 B2 * | 3/2004 | Mizugaki | 365/222 |
| 6,754,135 B2 | 6/2004 | Pilo | |
| 6,920,539 B2 * | 7/2005 | Qawami et al. | 711/167 |
| 6,953,923 B2 | 10/2005 | Yang et al. | |
| 7,106,915 B2 | 9/2006 | Dierickx | |
| 2002/0075715 A1 * | 6/2002 | Kwon | 365/51 |
| 2006/0245270 A1 * | 11/2006 | Louie et al. | 365/189.05 |

(Continued)

FOREIGN PATENT DOCUMENTS

| | | |
|---|---|---|
| JP | 60-025097 A | 2/1985 |
| JP | 2001-052482 A | 2/2001 |

(Continued)

OTHER PUBLICATIONS

Agrawal, Banit et al., "High-Bandwidth Network Memory System Through Virtual Pipelines", IEEE/ACM Transactions on Networking, vol. 17, No. 4, Aug. 2009, Entire Document.

(Continued)

*Primary Examiner* — Hiep Nguyen
(74) *Attorney, Agent, or Firm* — Dorsey & Whitney LLP (57) ABSTRACT

Apparatuses and methods for providing data are disclosed. An example apparatus includes a plurality of memories coupled to a data bus. The memories are configured to provide data to the data bus responsive, at least in part, to a first address. The plurality of memories are further configured to provide at least a portion of the data corresponding to the first address to the data bus during a sense operation for a second address provided to the plurality of memories after the first address. Each of the plurality of memories provides data to the data bus corresponding to the first address at different times. Moreover, a plurality of memories may be configured to provide at least 2N bits of data to the data bus responsive, at least in part, to an address, each of the plurality of memories configured to provide N bits of data to the data bus at different times.

25 Claims, 7 Drawing Sheets

(56) References Cited

U.S. PATENT DOCUMENTS

| | | |
|---|---|---|
| 2007/0058481 A1* | 3/2007 | Chen et al. ................. 365/233.5 |
| 2010/0110748 A1 | 5/2010 | Best |
| 2010/0131684 A1 | 5/2010 | Johnson |
| 2010/0220536 A1* | 9/2010 | Coteus et al. ................. 365/193 |

FOREIGN PATENT DOCUMENTS

| | | |
|---|---|---|
| JP | 2001-167578 A | 6/2001 |
| JP | 2003-263888 A | 9/2003 |
| KR | 20040110673 A | 12/2004 |

OTHER PUBLICATIONS

Notice of Rejection for JP Application No. 2013-031583 dated Oct. 15, 2013.

* cited by examiner

APPARATUSES AND METHODS FOR PROVIDING DATA FROM MULTIPLE MEMORIES

TECHNICAL FIELD

Embodiments of the present invention relate to memories generally, and more particularly, in one or more embodiments, to a multi-memory system configured to provide read data using interleaved data outputs.

BACKGROUND OF THE INVENTION

As memory devices of all types have evolved, continuous improvements have been made to enhance performance in a variety of respects. Increases in memory bandwidth, capacity, and reliability have been implemented in an attempt to satisfy evolving demands, such as in applications requiring high quality video playback. To achieve better performance, manufacturers have utilized several approaches. For example, in some instances, the bit width of a data bus of a memory system may be increased to provide additional bandwidth to external devices. This is not a solution for all manufacturers, however, as many devices cannot feasibly be retooled to interface with a larger data bus bit-width.

Other issues often arise in design considerations as well. One such issue is the performance limitation of memory associated with memory access response times. Typically, accessing data in memory may require that an address of memory first be sensed, and data corresponding to that address provided to a data bus. Thus, if a memory receives too many read commands within a particular time period, each command cannot be fully executed before the next command is received, and an output of incorrect or corrupt data may result. A sense operation in particular may incur substantial delays, limiting the frequency at which read commands may be executed, and as a result, also the rate at which data can be provided. Because the amount of time required to complete memory accesses is based at least in part by physical characteristics of the memory itself, increasing response times to improve output may not always be possible.

In some cases, designs can be implemented to increase performance, but at a cost of functionality. For example, some memories may be configured to execute page reads at a higher rate than other memories, but may be limited in their ability to efficiently respond to more random requests of read data. In other instances, memory designs may allow for more efficient operation, but may also limit the number of memories that can simultaneously operate in a memory system.

Therefore, a need exists for a system and method to provide improved data output without increasing data bus bit-width, limiting functionality, or increasing the frequency of read commands provided to a memory.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Figure 1:
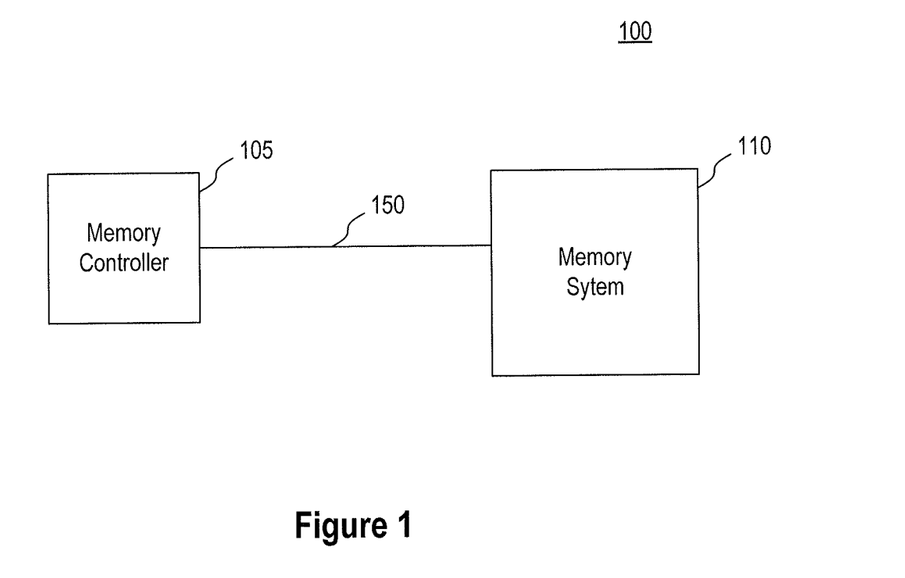
FIG. 1 is a block diagram of an embodiment of a an electronic system according to an embodiment of the invention.

FIG. 1 illustrates an apparatus in the form of an electronic system 100 according to an embodiment of the invention. A memory system 110 is coupled to a memory access device, such as a memory controller 105, by a communication bus 150. The memory system 110 may comprise a plurality of memories which may be identical to each other. Communication bus 150 may couple memory controller 105 to memories of the memory system 110 and may comprise a data bus, control bus, and/or an address bus. It will be appreciated by those having ordinary skill in the art, however, that any number of busses may be used to couple memory controller 105 and the memory system 110. Memory controller 105 may be configured to provide control (e.g., chip enable and/or output enable signals) and address signals to memory system 110 over communication bus 150, and may also provide and/or receive data signals to/from memory system 110 over communication bus 150.

Figure 2:
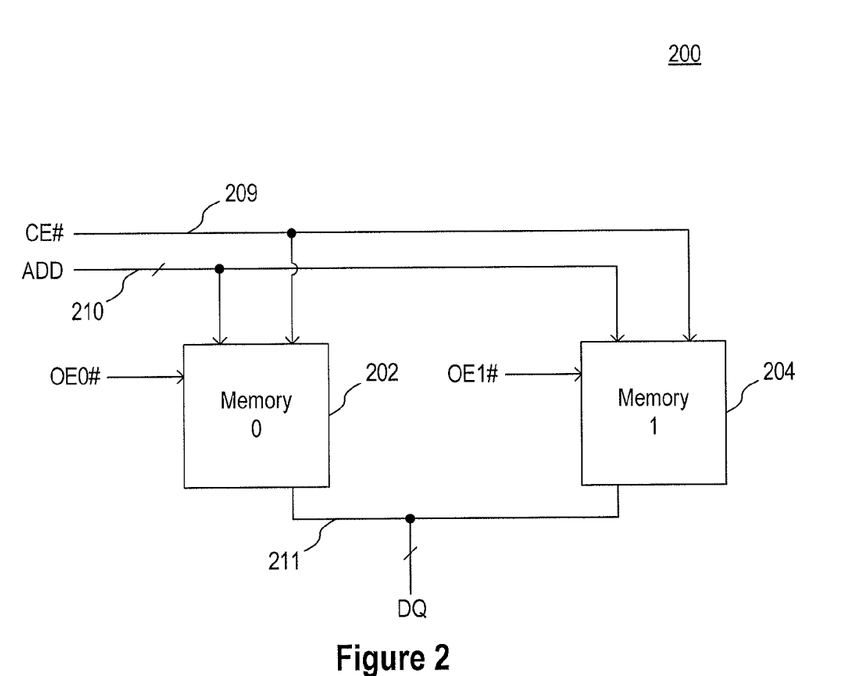
FIG. 2 is a block diagram of an embodiment of a memory system that may be used in the system of FIG. 1 according to an embodiment of the invention.

FIG. 2 illustrates an apparatus in the form of a memory system 200 according to an embodiment of the invention. The memory system 200 may be used for the memory system 110 of FIG. 1. The memory system 200 includes memories 202, 204. Memories 202, 204 may be coupled to a chip enable bus 209 and an address bus 210. According to one example embodiment, a bus can comprise one or more communication paths (e.g., conductive lines). A chip enable signal CE# is provided to the memories 202, 204 on the chip enable bus 209 and address signals ADD are provided to the memories 202, 204 on the address bus 210. Addresses of memory locations of the memories 202, 204 are represented by the ADD signals. Memories 202, 204 may also be coupled to a data bus 211 and configured to receive output enable signals OE0# and OE1#, respectively. The data bus 211 has a bus width (e.g., the number of communication paths) that is typically defined in a number of bits of the data provided on the data bus 211. The bus width of the data bus 211 may be the same width as the outputs of each of the memories 202, 204. That is, the data bus 211 may be only wide enough to provide/receive data to/from one of the memories 202, 204 at a time. In some embodiments, the bus width is 16-bits wide. The data bus 211, however, may be other widths as well. Although the memory system 200 includes memories 202, 204, other embodiments of the memory system 200 may use a greater or lesser number of memories. The memory system 200 is configured to provide approximately the same amount of data per memory command as a memory system configured to provide data of 2N bits wide although the data bus 211 of the memory system 200 has a bus width of N bits.

In at least one embodiment, address and control signals provided to memories 202, 204 may be provided by a memory controller, for example, memory controller 105 of system 100 as shown in FIG. 1. In other embodiments, signals may be received from any memory access device (e.g., control logic) as is well known in the art. It will be appreciated by those having ordinary skill in the art that other implementations may also be used without departing from the scope of the present invention.

Figure 3:
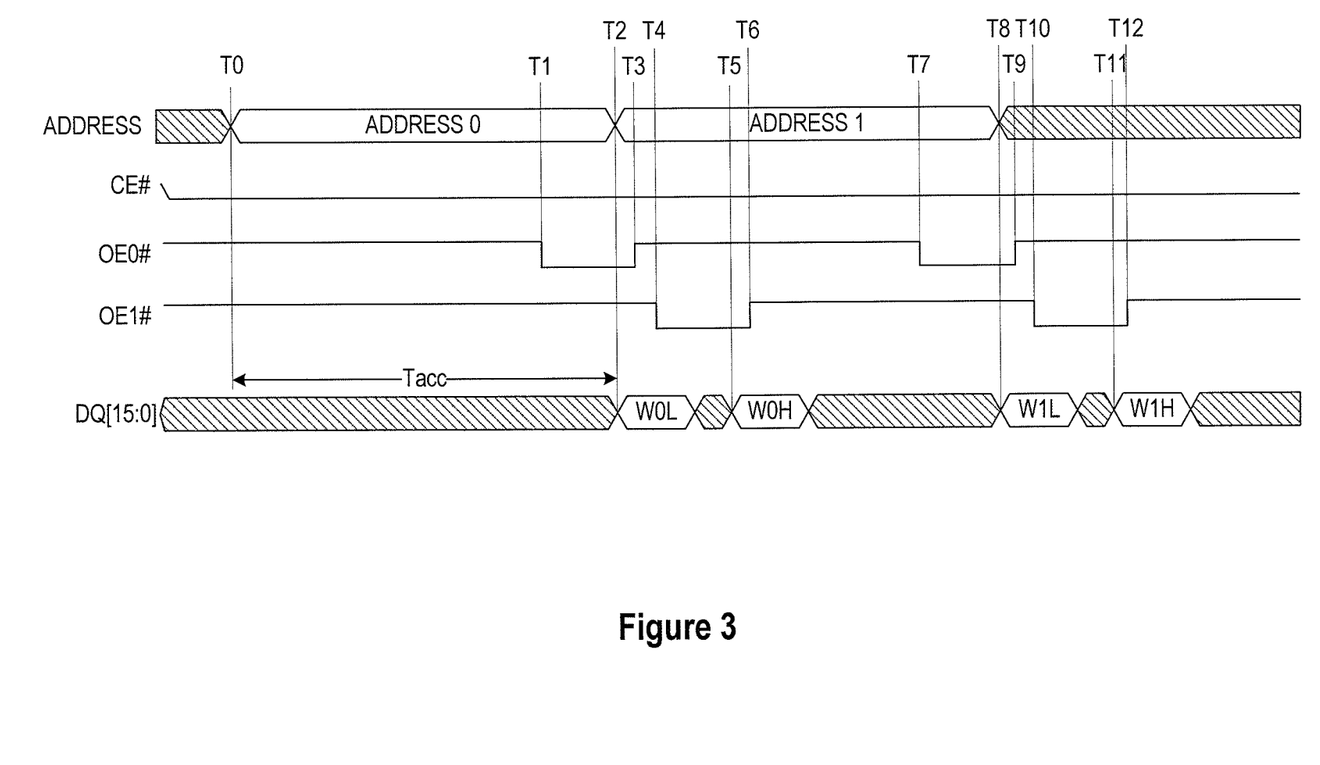
FIG. 3 is a timing diagram for a method of operation of the memory system in FIG. 2 according to an embodiment of the invention.

FIG. 3 illustrates a timing diagram of various signals during operation of a memory system according to an embodiment of the invention, for example, the memory system 200 illustrated in FIG. 2. The timing diagram of FIG. 3 will be described with reference to the memory system 200. In operation, memories 202, 204 may receive the CE# signal via chip enable bus 209. This may enable memories 202, 204 to receive or provide (e.g., transmit) data as part of the execution of memory commands, such as read commands. Moreover, the ADD signals may be received via address bus 210, such as to identify a particular group (e.g., a row or page of a row) of memory locations in each respective memory. In some embodiments, memories 202, 204 may receive the same address via a shared address bus 210. Address bus 210 may have a bit-width of, for example, 16, 32, or 64-bits, or may have any other bit-width. In at least one embodiment, addresses on address bus 210 may comprise a plurality of group (e.g., row) address bits (e.g., bits 26:4 on the address bus) and a plurality of page address bits (e.g., bits 3:0 on the address bus). For example, an address may comprise 28 row address bits and 4 page address bits. It will be appreciated by those having ordinary skill in the art, however, that addresses may have any number of bits and/or ratio of group (e.g., row) address bits to page address bits without departing from the scope of the present invention. As used hereinafter, an "address" can refer to a group address and/or a page address.

When an address represented by the ADD signals is provided, memories 202, 204 may automatically detect a signal transition of one or more of the ADD signals provided on the address bus 210. Responsive to detecting a signal transition, the memories 202, 204 may begin a memory access operation, for example, a read operation, in anticipation of accessing the memory location corresponding to the address. A typical memory access operation includes a sense operation where data for a group of memory locations corresponding to the address is sensed and then followed, in the case of a read operation, by a data output operation where data from the sensed group of locations is provided to a data bus by the memories 202, 204. Of the total time for a memory access operation, the sense operation may take the majority of the time, with the data output operation taking the remaining time. For example, in an example of a memory access operation taking 100 ns, the sense operation may take approximately 75 ns and the data output operation may take approximately 25 ns. Those ordinarily skilled in the art will appreciate that the specific times have been provided by way of example and that they are not intended to limit the scope of the present invention.

The sense operation may comprise memories 202, 204 accessing the group of memory locations corresponding to the address and coupling the data stored by at least a subset (e.g., a page) of the group of memory locations to a plurality of sense amplifiers (not shown). As will be described in more detail below, after a particular time has passed such that memories 202, 204 have completed sensing the data output operation may be performed. The output enable signals OE0# and OE1#, provided to memories 202, 204, respectively, may be activated (i.e., active low) to individually enable the outputs of each memory allowing each to selectively provide data onto the data bus. For example, the OE0# signal may be activated to enable the memory 202 to provide data onto the data bus 211, followed by activating the OE1# signal to enable the memory 204 to provide data onto the data bus 211. With respect to FIG. 3, Tacc represents the time for a memory to provide data after the memory is enabled, for example, in response to a signal transition of an ADD signal. That is, after a transition of the ADD signals provided on the address bus 210 is detected (representing a new address) and Tacc has elapsed the data corresponding to the address will be provided.

With reference to FIG. 3, at time T0, a first address represented by the ADD signals may be provided to memories 202, 204 via address bus 210. The memories 202, 204 may begin sensing data in response to detecting a transition of the ADD signals. As previously described, after a particular period of time has elapsed during which the memories 202, 204 have completed sensing, represented in FIG. 3 as time T1, the output enable signal OE0# may be made active to allow memory 202 to provide sensed data corresponding to the first address to data bus 211. At time T2, the data output operation (following the sense operation) has completed and the sensed data is ready to be provided. Further at time T2, memory 202 provides data to data bus 211.

A second address may also be provided on address bus 210 to memories 202, 204 at time T2. The memories 202, 204 may detect a signal transition of the ADD signals for the second address and begin the sense operation for the data corresponding to the second address.

After the data is provided by the memory 202 to the data bus 211 resulting from a data output operation, the output enable signal OE0# may be deactivated to disable the output of memory 202, as shown in FIG. 3 at time T3. At time T4, the output enable signal OE1# may be activated to allow memory 204 to provide data corresponding to the first address to data bus 211. At time T5, memory 204 may provide data corresponding to the first address onto data bus 211. Note that the memory 204 provides data before the sense operation for the second address is completed. The OE1# signal may be toggled, for example, at time T6, to disable the output of memory 204.

Data corresponding to the second address may be provided to the data bus 211 in substantially the same manner as for the data corresponding to the first address. For example, at time T7 the OE0# signal is activated to enable the output of the memory 202. The data corresponding to the second address is provided at time T8 by the memory 202 to the data bus 211. The OE0# signal is deactivated at time T9 and the OE1# signal is activated at time T10. As a result, the memory 204 provides the data corresponding to the second address at time T11. The OE1# signal is deactivated at time T12 to disable the output of the memory 204.

In at least one embodiment, the amount of time for the memories 202, 204 to provide the same amount of data in an interleaved manner to a data bus 211 having a bus width of N (e.g., 32-bits of data, 16-bits provided by each memory in an interleaved manner to a 16-bit bus) is no more than the amount of time for memories 202, 204 to simultaneously provide the data, using a data bus having a bus width of 2N (e.g., 32 bits, 16-bits provided by each memory simultaneously to a 32-bit bus). The interleaved operation takes advantage of the time for the sense operation to complete in that at least a portion of the data for a previous address may be provided during a sense operation for a subsequent address. The data corresponding to the previous address, however, should be provided by the memories 202, 204 before the sensing operation for the subsequent address completes. If the sensing of the subsequent address completes before data of the previous address is provided by the memories 202, 204, data provided to data bus 211 may be corrupted.

In some embodiments, a greater number of memories may be used, provided the time required to sequentially provide data from all memories is less than the time required for all memories to sense data in response to a subsequent address. For example, in one embodiment, the sense operation requires 75 ns to complete, while the data output operation requires 10 ns per memory. Under these circumstances, data from up to 7 memories of a memory system may be sequentially provided.

Figure 4A:
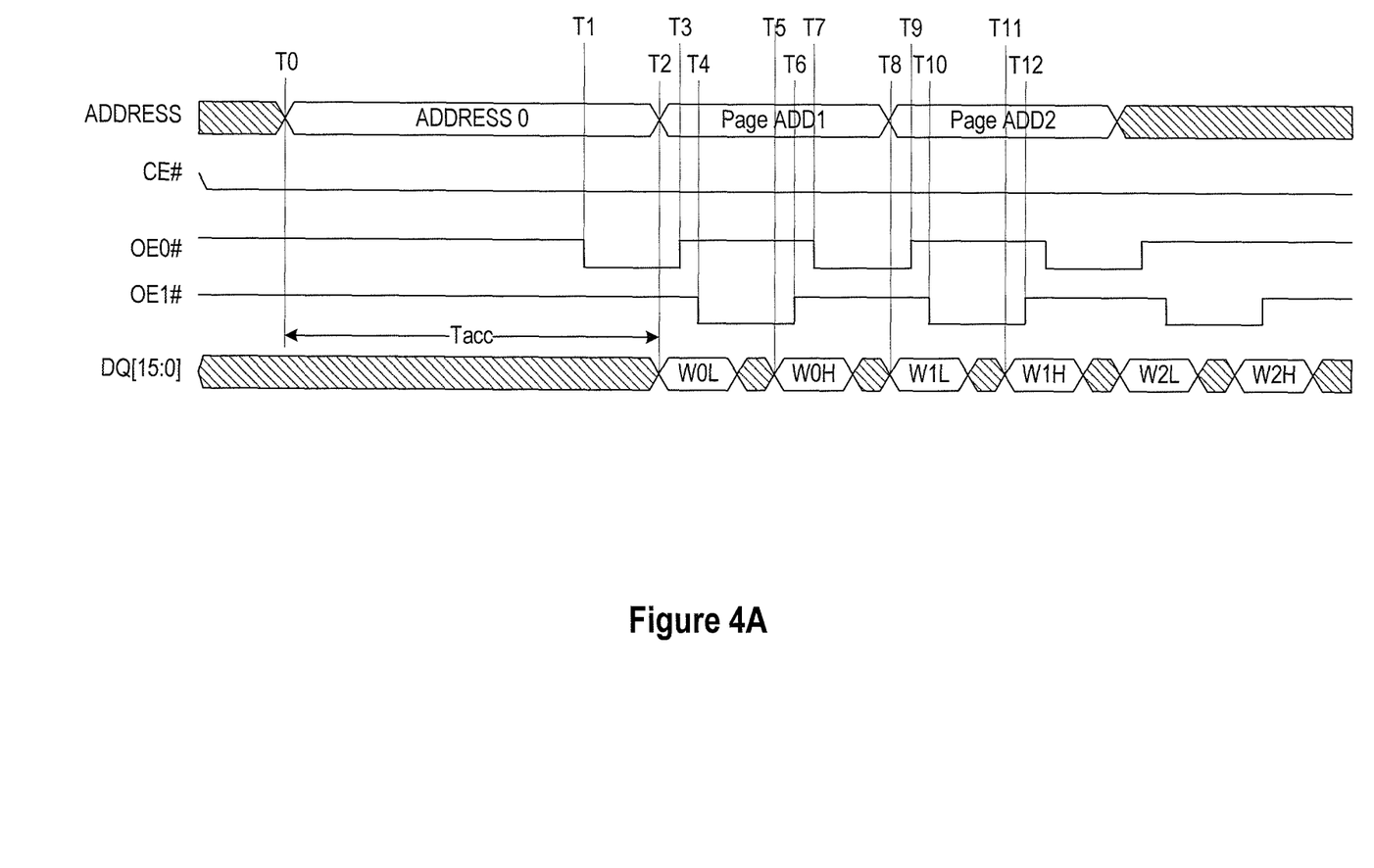
FIG. 4A is a timing diagram for a method of operation of the memory system in FIG. 2 according to an embodiment of the invention.
Figure 4B:
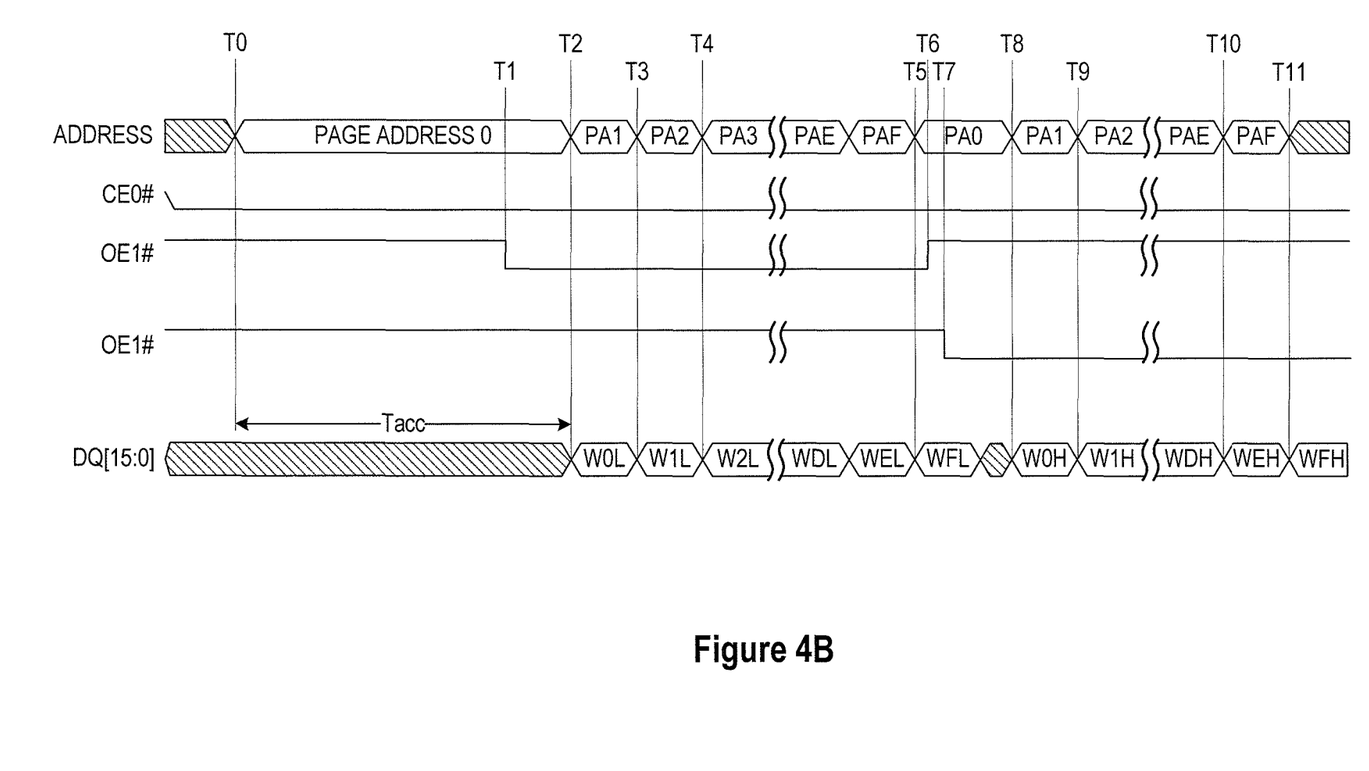
FIG. 4B is a timing diagram for a method of operation of the memory system in FIG. 2 according to an embodiment of the invention.

FIGS. 4A and 4B illustrate timing diagrams of various signals during operation of a memory system according to an embodiment of the invention. For example, the operation illustrated by FIGS. 4A and 4B may be used with the memory system 200 illustrated in FIG. 2. The timing diagrams of FIGS. 4A and 4B will be described with reference to the memory system 200. FIG. 4A shows a timing diagram for a method of operation of the memory system 200 in FIG. 2 utilizing an interleaved read from memories 202, 204. At time T0, ADD signals representing a first address are provided to memories 202, 204 via address bus 210. In response, the memories 202, 204 may begin the sense operations to begin simultaneously sensing data. After the sense operations have completed the data output operation is performed to provide the data corresponding to the first address. The output enable signal OE0# may be activated (shown in FIG. 4A at time T1) to enable the memory 202 to provide the data corresponding to the first address. At time T2, the memory 202 provides data to the data bus 211 and at time T3, the OE0# signal is deactivated to disable the output of the memory 202.

As previously described, addresses provided on address bus 210 may contain a plurality of page address bits that may be used to identify a particular subset of memory locations in a group of memory locations (i.e., page) of memory. For example, when a sense operation is performed, at least a subset of memory locations in a row of memory is sensed, and particular data in the sensed portion of the row may be identified by page bits of the address. Because much of the time of a sense operation involves opening a row in memory, accessing different data in a row already opened may not require a full sense operation.

At time T2, second page address bits identifying another particular subset of memory locations in the open row of memory from the first address is provided to memories 202, 204, as represented by the transition in page bits of the ADD signals. The memories 202, 204 may detect the transition on address bus 210 at time T2 and begin providing the data corresponding to the second address. At time T3, the OE0# signal is deactivated to disable the output of the memory 202, and at time T4, the output enable signal OE1# may be activated to allow memory 204 to provide data corresponding to the first address. Data is provided by the memory 204 to the data bus 211 at time T5 and at time T6, the OE1# signal is deactivated to disable the output of the memory 204.

As discussed above, because consecutive addresses provided to the memories 202, 204 identify data in the open row of memory (i.e., data already sensed), it may not be necessary to delay for a sense operation before providing data onto the data bus 211 corresponding to the subsequent address in the same open row. Thus, data corresponding to the second address can be provided sooner than in the case for data corresponding to the first address, and the data may be provided by the memories 202, 204 applying substantially the same sequence of signals as for providing the data corresponding to the first address. For example, at a time T7, output enable signal OE0# may be activated to allow memory 202 to provide (e.g., output) data corresponding to the second address. At time T8, data of the second address is provided by the memory 202 to the data bus 211. The OE0# signal is deactivated at time T9 to disable the output of memory 202 and the OE1# signal is activated at time T10 to enable the output of the memory 204. Data corresponding to the second address is provided by the memory 204 to the data bus 211 at time T11 and the output of the memory 204 is disabled by deactivating the OE1# signal at time T12. Also at time T8, a third address is provided to the memories 202, 204 and the process for accessing additional data from the open row of memory begins, as previously discussed with reference to the data corresponding to the second address.

As illustrated in the example of FIG. 4A, the memories 202, 204 are operated to provided data in an interleaved manner. At least a portion of the data corresponding to a memory address is provided by the memories 202, 204 during a sensing operation performed for a subsequent address provided to the memories 202, 204. In another embodiment, a greater number of memories may be used by coordinating the operation of each of the memories through the timing of the various signals so that the memories may provide data in an interleaved manner.

FIG. 4B illustrates a timing diagram for a method of operation of the memory system 200 in FIG. 2 utilizing an interleaved read from memories 202, 204. At time T0, ADD signals representing a first address are provided to memories 202, 204 via address bus 210. In response, the memories 202, 204 begin a sense operation. After the sense operation has completed, the output enable signal OE0# may be activated, as shown at time T1 to enable the output of memory 202 so that data may be provided to data bus 211. At time T2, the memory 202 provides the data corresponding to the first address to the data bus 211.

In contrast to the operation described with reference to FIG. 4A, at time T2, a second address is provided to the memories 202, 204 on address bus 210 to request a second data from the open row of memory to be provided by the same memory 202. As illustrated in FIG. 4B, a plurality of new addresses may be consecutively provided to memories 202, 204 over address bus 210, causing the memory 202 to provide the data from the open row corresponding to the respective address. The addresses provided to the memories 202, 204 may be related by incrementing page bits, for example, or may be random within the open row of memory. The data corresponding to each of the addresses may be sequentially provided to the data bus 211 by the memory 202, illustrated in FIG. 4B at times T2, T3, T4, and T5. The OE0# signal is deactivated at time T6 to disable the output of the memory 202.

At a time T5, a new first address is provided to memories 202, 204. At time T7, the output of memory 204 may be enabled by activating the OE1# signal such that the memory 204 will provide data to the data bus 211. As a result of disabling the output of memory 202 at time T6 and enabling the output of memory 204 at time T7, data corresponding to the new addresses are provided from memory 204 instead of memory 202. The data corresponding to the new addresses are provided by the memory 204, as illustrated in FIG. 4B at times T8, T9, T10, and T11. As described with reference to the timing diagram of FIG. 4B, data from an open row of memory may be first sequentially provided by one of the memories (e.g., memory 202) and then sequentially provided by the other one of the memories (e.g., 204) from the same or another row of open memory.

Figure 5:
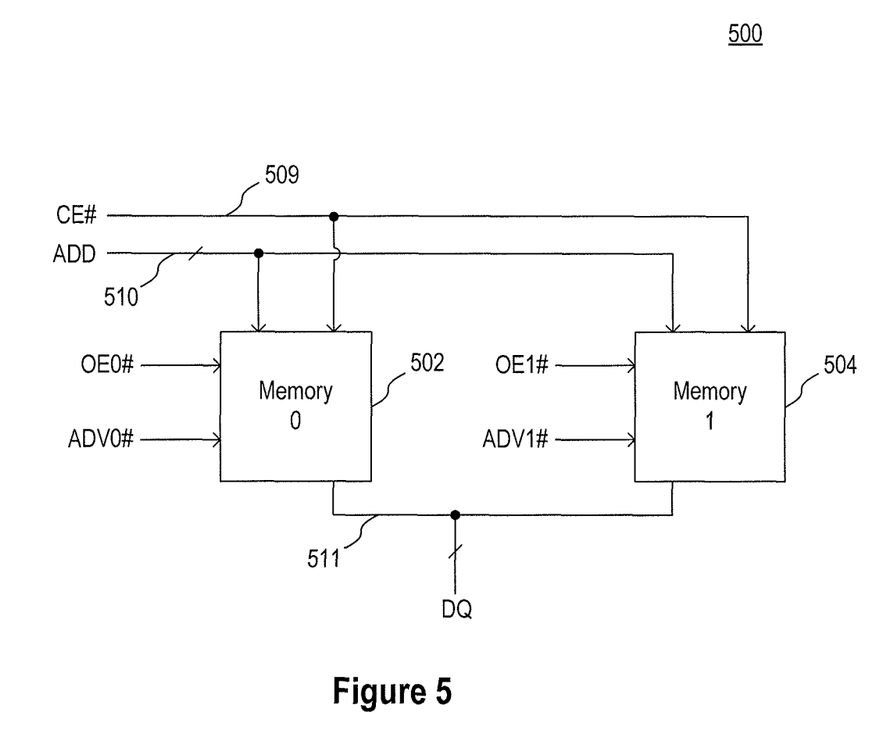
FIG. 5 is a block diagram of an embodiment of a memory system used in the system of FIG. 1 according to an embodiment of the invention.

FIG. 5 illustrates a memory system 500 according to an embodiment of the invention. The memory system 500 includes memories 502, 504. Memories 502, 504 may be coupled to a chip enable bus 509 and an address bus 510. A chip enable signal CE# is provided to the memories 502, 504 on the chip enable bus 509 and address signals ADD are provided to the memories 502, 504 on the address bus 210. Addresses of memory locations of the memories 502, 504 are represented by the ADD signals. Memories 502, 504 may also be coupled to a data bus 511 and configured to receive output enable signals OE0# and OE1#, respectively. The data bus 511 has a bus width that is typically defined in the number of bits of the data provided on the data bus 511. In some embodiments, the bus width is 16-bits wide. The data bus 211, however, may be other widths as well. Memories 502, 504 may further be configured to receive address valid signals ADV0# and ADV1#, and although the memory system 500 includes memories 502, 504, other embodiments of the memory device may use a greater number of memories. The memory system 500 is configured to provide approximately the same amount of data per memory command as a memory system configured to provide data of 2N bits wide although the data bus 211 of the memory system 500 has a bus width of N bits.

In at least one embodiment, address and control signals provided to memories 502, 504 may be provided by a memory controller 105 of system 100 as shown in FIG. 1. In other embodiments, signals may be received from any other memory access device, as is well known in the art. It will be appreciated by those having ordinary skill in the art that other implementations may also be used without departing from the scope of the present invention.

Figure 6:
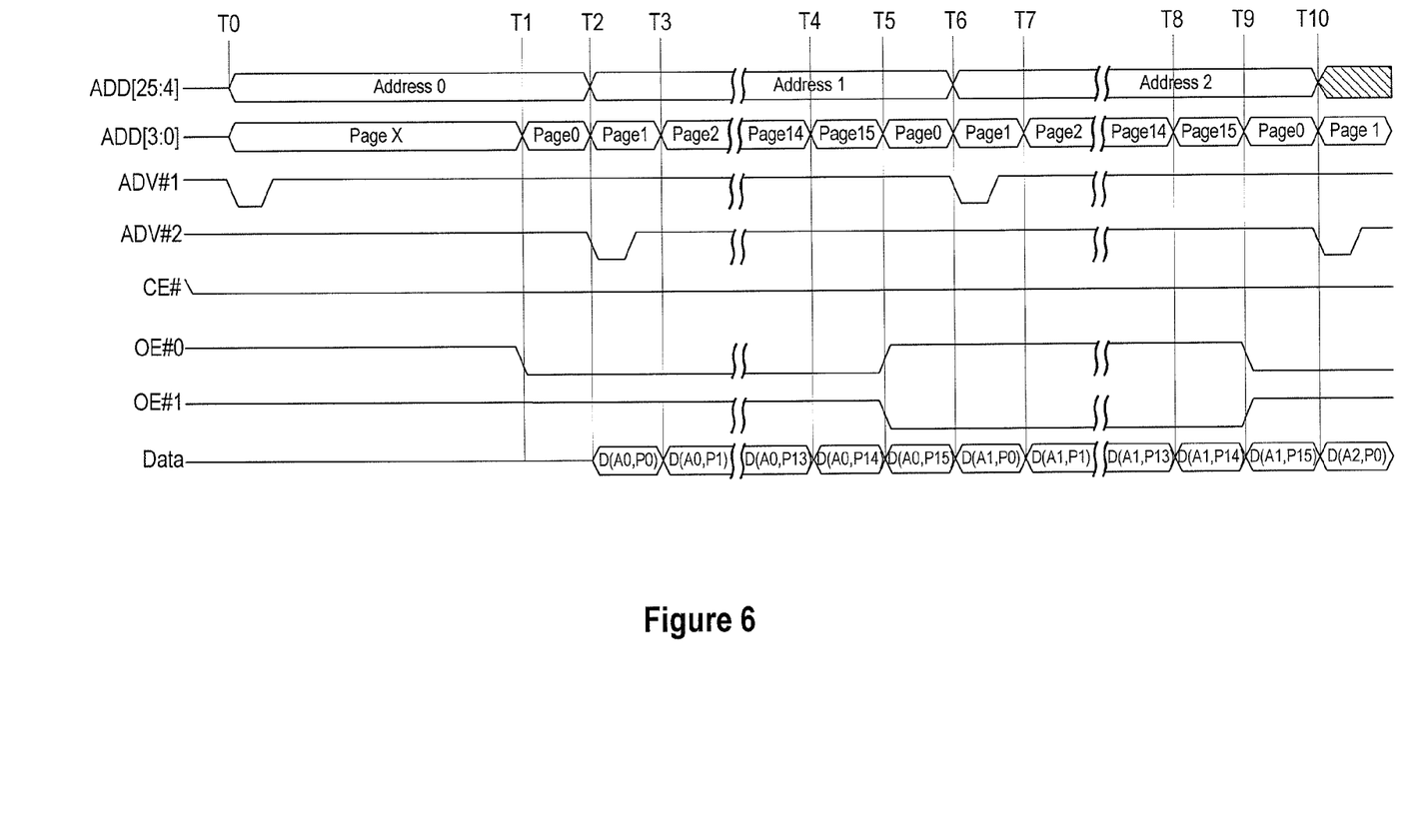
FIG. 6 is a timing diagram for a method of operation of the memory system in FIG. 5 according to an embodiment of the invention.

FIG. 6 illustrates a timing diagram of various signals during operation of a memory system according to an embodiment of the invention, for example, the memory system 500 illustrated in FIG. 5. The timing diagram of FIG. 6 will be described with reference to the memory system 500. In operation, memories 502, 504 may receive the CE# signal via chip enable bus 509. This may enable memories 502, 504 to receive or provide data as part of the execution of memory commands, such as read commands. Moreover, the ADD signals may be received via address bus 510 to identify a particular row of data in each respective memory. In some embodiments, memories 502, 504 may receive the same address via address bus 510. Address bus 510 may have a bit-width of, for example, 16, 32, or 64-bits, or may have any other bit-width. In at least one embodiment, addresses on address bus 510 may comprise a plurality of row address bits and a plurality of page address bits. For example, an address may comprise 22 row address bits and 4 page address bits. It will be appreciated by those having ordinary skill in the art, however, that addresses may have any number of bits and/or ratio of row address bits to page address bits without departing from the scope of the present invention.

In contrast to the operation of the memory system 200, memories 502, 504 may not automatically detect a transition of one or more of the ADD signals provided on address bus 510 and begin a respective memory access (e.g., sense) operation responsive to detecting the transition. Instead, activating the address valid signal ADV0# or the address valid signal ADV1# signals may trigger performance of the access operation on the memories 502, 504, respectively. The memory provided an address may begin a memory access operation, for example, a read operation, in anticipation of accessing the memory location corresponding to the address. Typical memory access operations includes a sense operation and in the case for a read operation, a data output operation. As discussed above, when a sense operation is performed, a particular subset of memory locations in a group of memory locations is sensed, and particular data corresponding to the memory locations in the row may be identified by page bits. Because a portion of a sense operation involves opening at least a portion of a row in memory, accessing different data in a row already opened may not require a full sense operation. Thus, a plurality of addresses may be consecutively provided to a memory, causing the memory to provide the data from the open row corresponding to the respective address.

As will be described in more detail below, after a particular period of time has passed such that a memory provided with an address has completed sensing, the data output operation may be performed, and either the OE0# signal or the OE1# signal may be activated to enable memory 502 or memory 504, respectively, to provide data onto the data bus 511.

FIG. 6 illustrates a timing diagram for a method of operation of the memory system 500 in FIG. 5 utilizing mimicked burst mode reads from memories 502, 504. At time T0, ADD signals representing a first address are provided to memories 502, 504 via address bus 510. The ADV0# may be activated to cause memory 502 to trigger a sense operation to be performed for the first address on address bus 510. After the sense operation has completed, at time T1, a second address is provided to memory 502 on address bus 510 to request a second data from the open row of memory to be provided by memory 502. Additionally, the output enable signal OE0# may be activated to enable the output of memory 502 so that data may be provided to data bus 511. At time T2, the memory 502 provides the data corresponding to the first address to the data bus 511. As illustrated in FIG. 6, a plurality of new addresses may be consecutively provided to memory 502 over address bus 510, causing the memory 502 to provide the data from the open row identified by the respective address. The addresses provided to memory 502 may be related by incrementing, or may be random, within the open row of memory. Data corresponding to each of the addresses may be sequentially provided to the data bus 511 by the memory 502, as illustrated in FIG. 6 at times T2, T3, T4, and T5. The OE0# signal is deactivated at time T5 to disable the output of memory 502.

A sense operation may be performed for a new initial address provided to memory 504 via address bus 510 at time T2 responsive to address valid signal ADV1# being activated. At time T5, the OE1# signal may be activated to enable the output of memory 504. As a result of disabling the output of memory 502 and enabling the output of memory 504 at time T5, memory 504 provides data to the data bus 511 instead of memory 502. Data corresponding to the new addresses are provided by the memory 502 as illustrated in FIG. 6 at times T6, T7, T8, and T9.

Data corresponding to the third address from time T6 may be provided to the data bus 211 in substantially the same manner as for the data corresponding to the first address. For example, at time T9, the OE0# signal is activated and the OE1# signal is deactivated. Data for the third address is provided by memory 502 at time T10 to data bus 511.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus, comprising:
    a data bus; and
    a plurality of memories coupled to the data bus, the plurality of memories configured to be enabled by a common enable signal and to provide data to the data bus responsive, at least in part, to a first address provided to the plurality of memories;
    wherein at least one of the plurality of memories is further configured to provide at least a portion of the data corresponding to the first address to the data bus during a sense operation for a second address provided to the plurality of memories after the first address, each of the plurality of memories providing data to the data bus at different times, and
    wherein the plurality of memories includes a first memory and a second memory, the first memory and second memory are each configured to perform a sense operation simultaneously for the first address.

2. The apparatus of claim 1, wherein at least one of a plurality of memories is further configured to provide data to the data bus based, at least in part, on activation of a corresponding output enable signal.

3. The apparatus of claim 1, wherein at least one of a plurality of memories is further configured to provide data without performing another sense operation for a new address.

4. The apparatus of claim 1, wherein at least one of a plurality of memories is configured to perform a sense operation responsive, at least in part, to activation of an address valid signal.

5. The apparatus of claim 1, wherein each of the plurality of memories is configured to receive a respective output enable signal, the respective output enable signals being separately activated to provide data of their corresponding memory to the data bus.

6. The apparatus of claim 1, wherein the plurality of memories are configured to provide their respective data corresponding to the first and second addresses to the data bus in an interleaved manner.

7. The apparatus of claim 1 wherein each of the plurality of memories have an output data width, and a data width of the data bus is the same as the output data width of the memories.

8. A method of outputting data, comprising:
    providing a common active enable signal to both a first memory and a second memory;
    providing a first address to the first memory and to the second memory;
    performing a sense operation for the first address in at least one of the first memory and the second memory;
    outputting data corresponding to the first address from the first memory;
    outputting data corresponding to the first address from the second memory after the data corresponding to the first address is output from the first memory;
    providing a second address to the first memory and the second memory; and
    performing a sense operation for the second address in at least one of the first memory and the second memory, at least a portion of the data being output from at least one of the first and second memories during at least a portion of the sense operation being performed for the second address, wherein the first memory and the second memory are each configured to perform a sense operation simultaneously for the first address.

9. The method of claim 8, wherein said outputting data corresponding to the first address from the first memory comprises:
    outputting the data corresponding to the first address from the first memory responsive to activation of a corresponding output enable signal.

10. The method of claim 8, wherein said performing a sense operation for the second address in the first memory and the second memory is responsive, at least in part, to a transition from the first address to the second address.

11. The method of claim 8, wherein the first address and the second address correspond to a same row of memory.

12. The method of claim 8, further comprising:
    outputting data corresponding to the second address from the first memory; and
    outputting data corresponding to the second address from the second memory after the data corresponding to the second address is output from the first memory.

13. The method of claim 12, wherein the data corresponding to the first and second addresses are output from the first and second memories in an interleaved manner.

14. The method of claim 12, wherein the data corresponding to the first and second addresses are output from the first memory and the data corresponding to the first and second addresses are output from the second memory after the data corresponding to the first and second addresses are output from the first memory.

15. A method of providing data, comprising:
    enabling a first memory and a second memory using a commonly provided enable signal;
    providing a first address to the first memory and the second memory;
    performing a sense operation in the first memory for the address;
    in response to the first address, providing N-bits of data from the first memory to a N-bit wide bus;
    in response to the first address, providing N-bits of data from the second memory to the N-bit wide bus at a different time than said providing N-bits of data from the first memory
    providing a second address to the first and second memories;
    performing a sense operation in the first and second memories for the second address; and
    wherein the N bits of data from the first and second memories for the first address are provided to the N-bit wide bus before the sense operation for the second address is complete.

16. The method of claim 15, wherein the N-bits of data from the first memory are provided to the N-bit wide bus before the N-bits of data from the second memory are provided to the N-bit wide bus.

17. The method of claim 15, further comprising:
    before providing N-bits of data from the second memory, performing a sense operation in the second memory.

18. The method of claim 15, wherein said performing a sense operation in the first memory is based, at least in part, on activation of an address valid signal.

19. The method of claim 15, wherein the address includes at least one page bit.

20. The method of claim 15, wherein the method further comprises:
    performing a sense operation in the second memory for a second address, wherein at least a portion of the N bits of data are provided from the first memory during the sense operation in the second memory for the second address.

21. An apparatus, comprising:
a memory access device; and
a memory system communicatively coupled to the memory access device, comprising:
   a data bus having a bit-width of N-bits; and
   a plurality of memories coupled to the data bus, wherein the plurality of memories are enabled at least in part, by a same chip enable signal provided to the plurality of memories;
wherein the plurality of memories is configured to provide at least 2 N-bits of data to the data bus responsive, at least in part, to a first address, wherein at least one of the plurality of memories is further configured to provide at least a portion of the data corresponding to the first address to the data bus during a sense operation for a second address provided to the plurality of memories after the first address, each of the plurality of memories configured to provide N bits of data to the data bus at different times.

22. The apparatus of claim 21, wherein individual ones of the plurality of memories are further configured to automatically detect a signal transition on an address bus.

23. The apparatus of claim 22, wherein individual ones of the plurality of memories are further configured to begin a respective memory access operation responsive to detecting the signal transition.

24. The apparatus of claim 21, wherein individual ones of the plurality of memories are further configured to sequentially provide N bits of data to the data bus responsive, at least in part, to receipt of the first address.

25. The apparatus of claim 21, wherein each of the plurality of memories are configured to receive a respective output enable signal and further configured to provide data responsive, at least in part, to the respective output enable signal.

* * * * *